United States Patent
Hong et al.

(10) Patent No.: US 12,401,568 B2
(45) Date of Patent: Aug. 26, 2025

(54) POLICY DETERMINING METHOD AND DEVICE, AND STORAGE MEDIUM

(71) Applicant: BEIJING XIAOMI MOBILE SOFTWARE CO., LTD., Beijing (CN)

(72) Inventors: Wei Hong, Beijing (CN); Lei Yu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 78 days.

(21) Appl. No.: 18/284,814

(22) PCT Filed: Mar. 30, 2021

(86) PCT No.: PCT/CN2021/084075
§ 371 (c)(1),
(2) Date: Sep. 28, 2023

(87) PCT Pub. No.: WO2022/204973
PCT Pub. Date: Oct. 6, 2022

(65) Prior Publication Data
US 2024/0187307 A1    Jun. 6, 2024

(51) Int. Cl.
*H04L 41/0894* (2022.01)
*H04L 12/14* (2024.01)

(52) U.S. Cl.
CPC ...... *H04L 41/0894* (2022.05); *H04L 12/1407* (2013.01)

(58) Field of Classification Search
CPC ............ H04L 41/0894; H04L 12/1407; H04L 41/0893; H04L 12/14
See application file for complete search history.

(56) References Cited

U.S. PATENT DOCUMENTS

| | | | |
|---|---|---|---|
| 2009/0049518 A1 | 2/2009 | Roman et al. | |
| 2018/0294984 A1 | 10/2018 | Poh et al. | |
| 2020/0396649 A1* | 12/2020 | Zong | H04W 36/00 |
| 2021/0122261 A1* | 4/2021 | Qiao | H04W 4/40 |
| 2021/0192867 A1* | 6/2021 | Fang | G07C 5/0808 |
| 2022/0141662 A1* | 5/2022 | Liao | H04W 12/08 726/1 |

(Continued)

FOREIGN PATENT DOCUMENTS

| | | |
|---|---|---|
| CN | 110650023 A | 1/2020 |
| CN | 111586670 A | 8/2020 |
| WO | 2019218847 A1 | 11/2019 |

OTHER PUBLICATIONS

International Search Report of PCT/CN2021/084075 dated Dec. 31, 2021 with English translation, (4p).

(Continued)

*Primary Examiner* — Tonia L Dollinger
*Assistant Examiner* — Mehulkumar J Shah
(74) *Attorney, Agent, or Firm* — Arch & Lake LLP

(57) ABSTRACT

The present disclosure relates to a policy determining method, a network device, and a storage medium. The policy determining method is executed by a network device, and includes: obtaining a plurality of policy requests for one or more terminals in a terminal group; and determining a first policy request among the plurality of policy requests, the first policy request being configured to update a policy of the terminal group.

9 Claims, 5 Drawing Sheets

(56) References Cited

U.S. PATENT DOCUMENTS

2022/0272620 A1* 8/2022 Ninglekhu ............ H04W 40/02
2023/0269627 A1* 8/2023 Tu .......................... H04L 65/80
                                                      455/422.1

OTHER PUBLICATIONS

Nokia, "Multi PCF architecture for Dynamically Changed AM Policies in 5GC", S2-2003140, S2SA WG2 Meeting #S2-138E, Apr. 11, 2020, (6p).
Nokia, "KI 1: Update to Solution #13" S2-2007857, SA WG2 Meeting #141e, Oct. 22, 2020, (9p).
3GPP TS 23.501 V18.3.0 (Sep. 2023), 3rd Generation Partnership Project; Technical Specification Group Services and System Aspects; System architecture for the 5G System (5GS); Stage 2, (Release 18), (686p).
3GPP TS 23.502 V18.3.0 (Sep. 2023), 3rd Generation Partnership Project; Technical Specification Group Services and System Aspects; Procedures for the 5G System (5GS); Stage 2, (Release 18), (889p).
3GPP TS 23.503 V18.3.0 (Sep. 2023), 3rd Generation Partnership Project; Technical Specification Group Services and System Aspects; Policy and charging control framework (5GS); Stage 2, (Release 18), (176p).
SA1, New SID: Study on supporting tactile and multi-modality communication services (from S1-204384), SP-201039, 3GPP TSG-SA Meeting #90e, Electronic Meeting, Dec. 2020, (3p).
Chinese Patent Office, Office Action issue in Application No. 202180001024.7, First Office Action, dated on Apr. 20, 2023.(17p).
Chinese Patent Office, Office Action issue in Application No. 202180001024.7, Second Office Action, dated on Nov. 04, 2023. (13p).

* cited by examiner

POLICY DETERMINING METHOD AND DEVICE, AND STORAGE MEDIUM

CROSS-REFERENCE TO RELATED APPLICATION

The present application is the U.S. national phase application of International Application No. PCT/CN2021/084075, filed on Mar. 30, 2021, the disclosure of which is incorporated herein by reference in its entirety for all purposes.

BACKGROUND

With the development of artificial intelligence, multi-modality interaction and multi-modality machine learning have become important research directions. Multi-modality technology needs to fuse and process multi-modality information to obtain a better interaction experience.

SUMMARY

The present disclosure relates to the field of wireless communication technology, and in particular, to a policy determining method, a network device, and a storage medium. The present disclosure provides a policy determining method, a network device, and a storage medium.

A first aspect of embodiments of the present disclosure provides a policy determining method, performed by a network device and including:

obtaining a plurality of policy requests for one or more terminals in a terminal group; and determining a first policy request among the plurality of policy requests, the first policy request being configured to update a policy of the terminal group.

A second aspect of embodiments of the present disclosure provides a network device including a processor and a memory, wherein the memory has a computer program stored thereon that, when being executed by the processor, causes the communication device to perform the policy determining method according to the first aspect or any implementation of the first aspect described above.

A third aspect of embodiments of the present disclosure provides a non-transitory computer readable storage medium for storing instructions that, when being executed, cause the policy determining method according to the first aspect or any implementation of the first aspect described above.

It should be understood that the above general description and the following detailed description are merely exemplary and explanatory and do not limit the present disclosure.

BRIEF DESCRIPTION OF THE DRAWINGS

The accompanying drawings herein, which are incorporated into and form a part of the specification, illustrate embodiments consistent with the present disclosure and are used in conjunction with the specification to explain the principle of the present disclosure.

DETAILED DESCRIPTION

Figure 1:
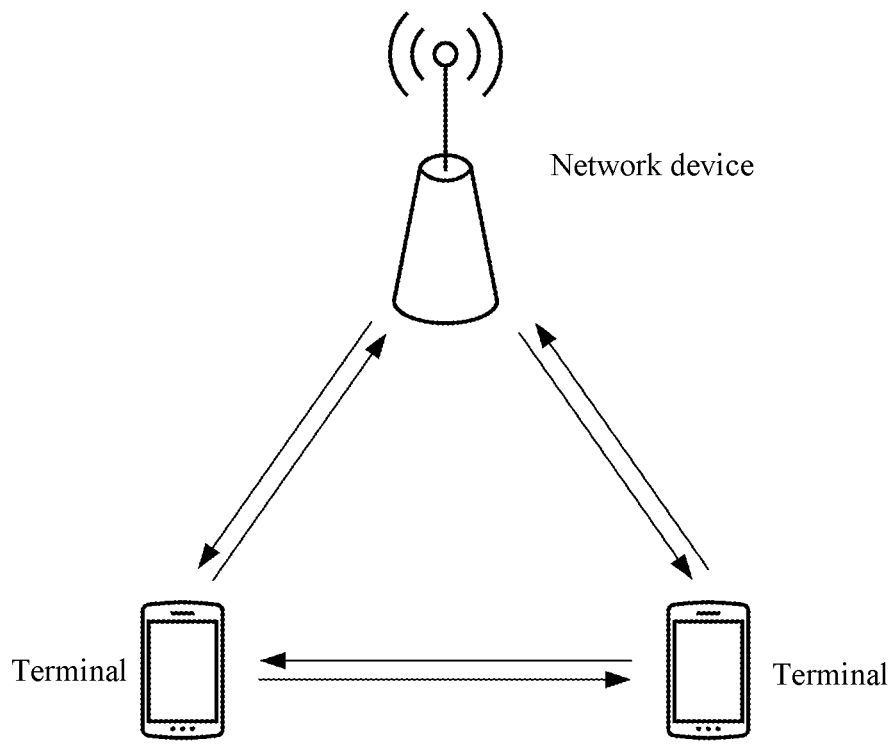
FIG. 1 is an architecture diagram of a communication system of a network device and a terminal according to an embodiment of the present disclosure.

Exemplary embodiments will be described herein in detail, examples of which are represented in the accompanying drawings. When the following description is made with reference to the accompanying drawings, the same reference numerals in different figures indicate the same or similar elements unless otherwise indicated. The implementations described in the following embodiments do not represent all implementations consistent with the present disclosure. Rather, they are only examples of devices and methods consistent with some aspects of the present disclosure as detailed in the appended claims.

In the related art, when processing multi-modality data, a multi-modality may be treated as an application, and coprocessing of multi-modality multiple protocol data unit (PDU) session may be conducted in an application layer (AL). When an application function (AF) session of a terminal determines to update a policy for the terminal, a policy control function (PCF) updates the policy for the terminal based on a policy update request provided by the AF session. However, when the PCF receives a plurality of policy update requests from a plurality of AFs at the same time or over a period of time, there may be a conflict between the policies in the plurality of policy update requests, and the PCF cannot select the policy for updating the terminal.

FIG. 1 is a diagram of a communication system architecture of a network device and a terminal according to an embodiment. A communication method provided by the present disclosure may be applied in the communication system architecture shown in FIG. 1. As shown in FIG. 1, a network side device may send signalling based on the architecture shown in FIG. 1.

It is to be understood that the communication system of the network device and the terminal shown in FIG. 1 is for schematic illustration only, and the communication system may further include other network devices such as a core network device, a wireless relay device, and a wireless backhaul device, which are not shown in FIG. 1. The embodiment of the present disclosure does not limit the number of network devices and the number of terminals in the wireless communication system.

It is further to be understood that the wireless communication system of the embodiment of the present disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. A network can be classified, according to capacity, rate, latency, and other factors of different networks, to be 2G (generation) network, 3G network, 4G network, or future evolution network such as a 5G network, which can also be referred to as a New Radio (NR) network. For ease of description, the wireless communication network may be referred to as a network sometimes in the present disclosure.

Further, the network device involved in the present disclosure may also be referred to as a wireless access network device. The wireless access network device may be a base station, an evolved node B (base station), a home base station, an access point (AP) in a wireless fidelity (WIFI) system, a wireless relay node, a wireless backhaul node, a transmission point (TP) or a transmission and reception point (TRP), may also be a gNB in a NR system, or may also be a component or a part of a device that constitutes a base station. The network device may also be an in-vehicle device in a vehicle to everything (V2X) communication system. It should be understood that the embodiment of the present disclosure does not limit the specific technology and the specific device form used for the network device.

Further, the terminal involved in the present disclosure, which may also be referred to as a terminal device, user equipment (UE), mobile station (MS), mobile terminal (MT) or the like, is a device that provides voice and/or data connectivity to a user, for example, the terminal may be a handheld device, an in-vehicle device or the like with a wireless connectivity function. Currently, some examples of terminals are a mobile phone, a pocket personal computer (PPC), a handheld computer, a personal digital assistant (PDA), a laptop computer, a tablet computer, a wearable device, an in-vehicle device or the like. In addition, the terminal device may also be an in-vehicle device in the vehicle to everything (V2X) communication system. It should be understood that the embodiment of the present disclosure does not limit the specific technology and the specific device form used for the terminal.

In the communication technology (SP-201039), study on supporting tactile and multi-modality communication services may include at least the following:
(1) new use cases of immersive real time experience involving tactile and multi-modality user interactions, which may include closed-loop feedback and control under various degrees of freedom (DoFs),
(2) potential requirements of the identified use cases including: coordinated parallel transmission of multiple modality representations (e.g. video, audio, haptic, ambient information) associated with the same application; network reliability and availability; charging, security and privacy; KPIs for specific use cases, e.g. data rate, latency, transfer interval, survival time, etc.,
(3) gap analysis between potential new requirements and existing requirements and functionalities supported by the network.

For coordinated parallel transmission of multiple modality representations (e.g. video, audio, haptic, ambient information) associated with the same application, the following implementations may be used.

A group of terminals may collaborate to conduct an action or an application, thus the policy authorized to the AF session of each terminal in the group may be adjusted due to the policy change of another terminal in the same group or that the policy of each terminal in the group shall be updated all together. For example, the group of terminals share the group UE Aggregate Bit Rate (UE-AMBR), and when the UE-AMBR of terminal 1 increases, the UE-AMBR of terminal 2 decreases. When the Allocation and Retention Priority (ARP) of the AF session of the terminal 1 is increased, the ARP of the AF session of the terminal 2 is decreased. When one traffic steering policy is applied to the terminal 1, the same or a different traffic steering policy is applied to the terminal 2. The policy of each AF session can be coordinated at either application level or 3GPP level. This solution assumes that the policy of each AF session is coordinated at 3GPP level.

In related art, the PCF determines the policy of the terminal group through a communication protocol. For example, based on TS23.501, a mechanism in policy requirements applicable to a plurality of terminals and applicable to a plurality of PCFs are provided. However, when an AF session of a terminal decides to update its policy, it provides a new policy requirement to the PCF serving the AF session of the terminal, and the PCF may determine a new policy for the terminal based on the updated policy requirement. Further, it is noted that the PCF may receive a new policy requirement for another terminal in the terminal group from another PCF. Therefore, when the PCF receives a plurality of policy-updating requests sent by a plurality of AFs at the same time or over a period of time, there may be a conflict between the policies in the plurality of policy update requests, and the PCF cannot select a policy for the update by the terminal.

In view of the above, the present disclosure provides a policy determining method. When there are different new policy requirements for different terminals in a terminal group, e.g., from AF and other PCFs, at the same time or within a short period of time, the PCF determine a group policy that satisfies all the requirements. If there is no group policy that satisfies all the policy requirements, the PCF determines a policy that satisfies the requirements as much as possible based on a priority of each terminal or a priority of the group policy.

Figure 2:
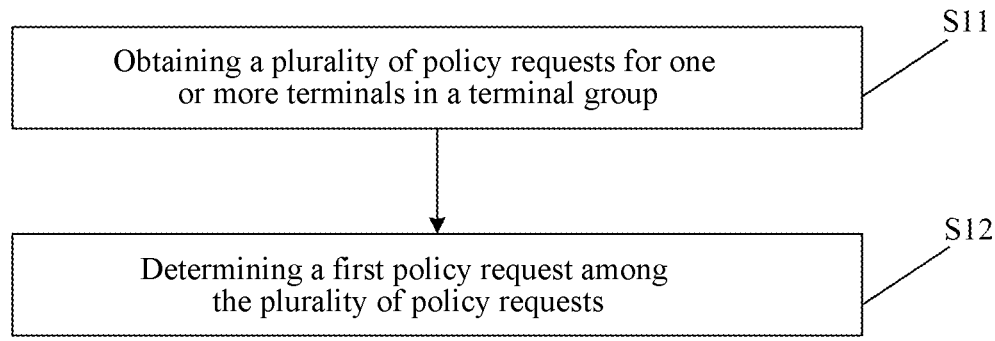
FIG. 2 is a flowchart of a policy determining method according to an embodiment of the present disclosure.

FIG. 2 is a flowchart of a policy determining method according to an embodiment. As shown in FIG. 2, the policy determining method is applied to a network device and includes:
step S11, obtaining a plurality of policy requests for one or more terminals in a terminal group; and
step S12, determining a first policy request among the plurality of policy requests.

In an embodiment of the present disclosure, the first policy request is used to update a policy of the terminal group. The network device may be a PCF, and there may be one or more PCFs. The first policy is used to update the policy of the terminal group, and the terminal group includes one or more terminals.

In an embodiment of the present disclosure, in response to the network device obtaining the plurality of policy requests of the one or more terminals in the terminal group, a group policy request satisfying all the terminals in the terminal group is determined based on the plurality of policy requests.

In an embodiment of the present disclosure, in response to the network device obtaining the plurality of policy requests of the one or more terminals in the terminal group, if, among the plurality of policy requests, there is no group policy request that can satisfy all the terminals in the terminal group, the first policy request for updating the policy of the terminal group is determined among the plurality of policy requests. In the present disclosure, a policy request including that for updating the terminal group is referred to as the first policy request for ease of description.

The policy determining method according to the embodiment of the present disclosure, by determining the policy of the terminal group, solves a problem that the policy of the terminal group cannot be determined when there is a conflict in policy requests of the plurality terminal in the terminal group.

Figure 3:
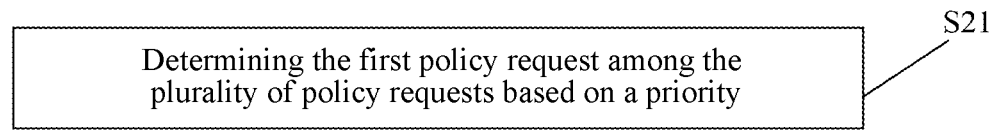
FIG. 3 is a flowchart of another policy determining method according to an embodiment of the present disclosure.

FIG. 3 is a flowchart of a policy determining method according to an embodiment. As shown in FIG. 3, the policy determining method is applied to a network device and includes:

step S21, determining the first policy request among the plurality of policy requests based on a priority.

In an embodiment of the present disclosure, the priority includes a first priority determined based on the policy. Each policy corresponds to one first priority, i.e., a correspondence between each policy and its first priority is determined, and an application level determines a group policy of the terminal group based on each terminal in the terminal group. The network device determines a correspondence between the terminal group policy and its first priority based on a communication protocol or a predefined rule, as may be seen in Table 1.

TABLE 1

|  | First priority of policy | Terminal 1 | Terminal 2 | ...... | Terminal n |
| --- | --- | --- | --- | --- | --- |
| Group policy 1 | PP1 | P11 | P12 | ...... | P1n |
| Group policy 1 | PP2 | P21 | P22 | ...... | P2n |
| ...... | ...... | ...... | ...... | ...... | ...... |
| Group policy 1 | PPm | Pm1 | Pm2 | ...... | Pmn |

It is to be understood that each of the elements in Table 1 exists independently, and these elements are exemplarily listed in the same table, which however does not indicate that all of the elements in the table must exist at the same time according to what is shown in the table. The value of each of the elements is independent of the value of any other element in Table 1. Therefore, it is to be understood by a person skilled in the art that the value of each of the elements in Table 1 is an independent embodiment.

In an embodiment of the present disclosure, the network device, in response to obtaining the plurality of policy requests for the terminal group, determines the first policy request among the plurality of policy requests based on the first priority.

For example, the plurality of policy requests may include P11, P21 and Pm1, and the group policy for which the terminal group requests to update is determined based on P11.

In an embodiment of the present disclosure, the priority includes a second priority determined based on the terminal in the terminal group. Each terminal in the terminal group corresponds to the second priority of that terminal. The network device determines a correspondence between the terminal and its second priority based on a communication protocol or a predefined rule.

In an embodiment of the present disclosure, the network device, in response to obtaining the plurality of policy requests for the terminal group, determines the second priority of the terminal corresponding to each policy request, and determines the first policy request among the plurality of policy requests based on the second priority.

In an embodiment of the present disclosure, the policy determining method is used in the network device, and the PCF of the network device may obtain the plurality of policy requests of the terminal group by using the following implementation.

Figure 4:
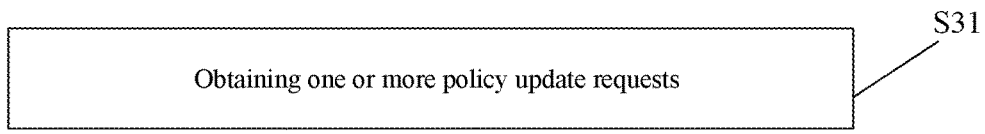
FIG. 4 is a flowchart of another policy determining method according to an embodiment of the present disclosure.

FIG. 4 is a flowchart of a policy determining method according to an embodiment. As shown in FIG. 4, in an embodiment of the present disclosure, a same PCF may obtain, via a NEF, a plurality of policy update requests sent by a plurality of AFs, which includes:

step S31, obtaining one or more policy update requests.

In an embodiment of the present disclosure, the one or more policy update requests include one or more policy requests corresponding to one or more terminals in the terminal group. In other words, when the AF obtains the policy request of the terminal, it sends a policy update request (Nnef_AFsessionWithQoS_Update Requedt) to a network exposure function (NEF). The NEF, based on the received policy update request, performs an authorization, and once the authorization is successful, the NEF sends a policy update request (Npcf_PolicyAuthorization_Update Requedt) to the PCF. For the terminal group, each terminal in the terminal group requests the required policy request from its corresponding AF. The PCF obtains the plurality of policy update requests via the NEF, and thus obtains one or more policy requests for the terminal group.

Figure 5:
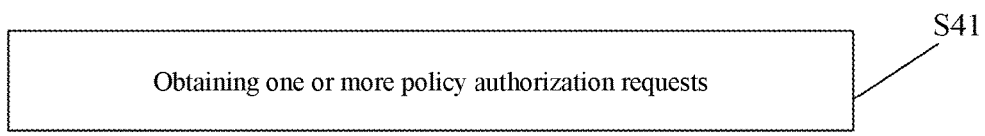
FIG. 5 is a flowchart of another policy determining method according to an embodiment of the present disclosure.

FIG. 5 is a flowchart of a policy determining method according to an embodiment. As shown in FIG. 5, in an embodiment of the present disclosure, a plurality of PCFs may obtain, via a plurality of NEFs, policy update requests sent by a plurality of AFs, which includes:

step S41, obtaining one or more policy authorization requests.

Figure 6:
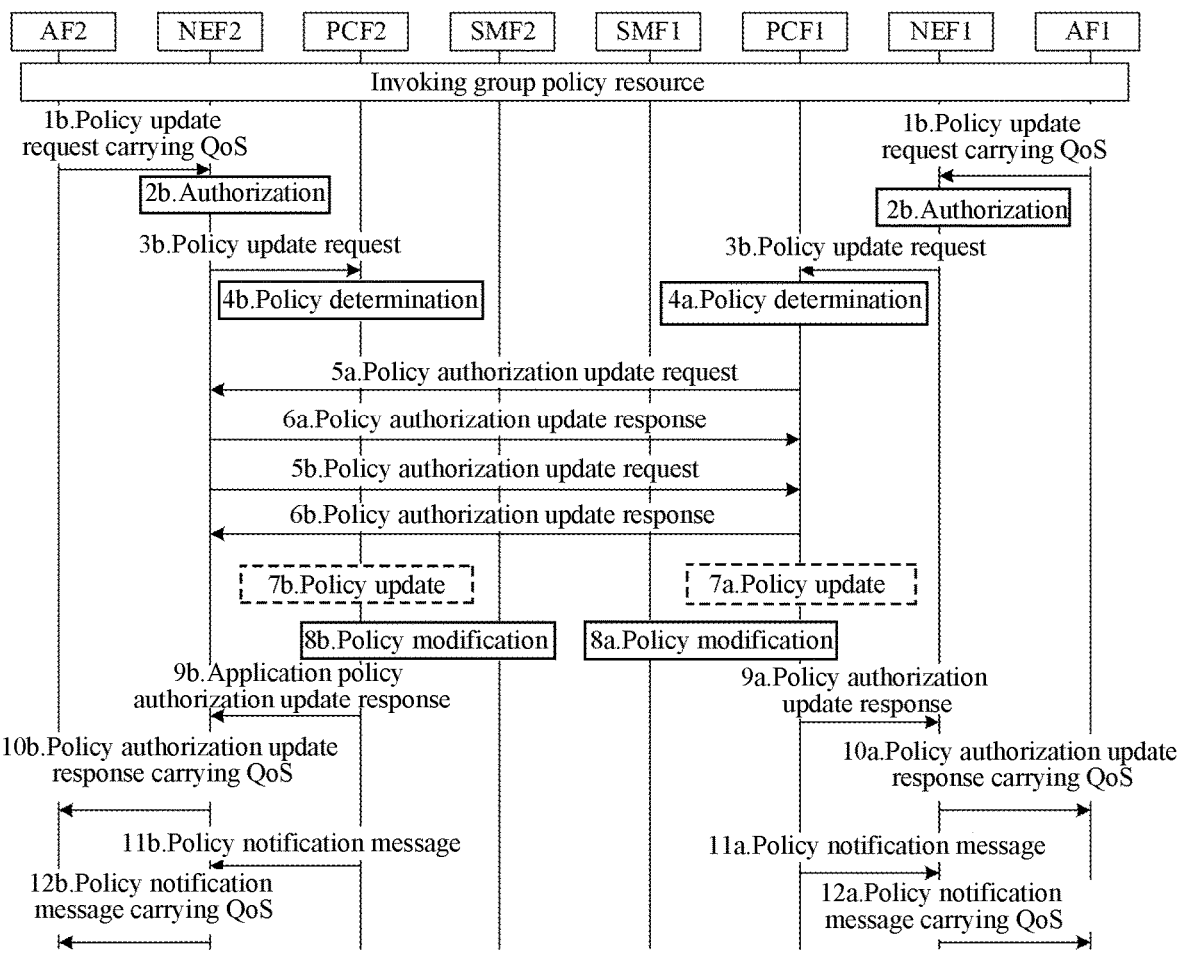
FIG. 6 is an interaction diagram of a policy determining method according to an embodiment of the present disclosure.

In an embodiment of the present disclosure, the one or more policy authorization requests include one or more policy requests determined by an other network device for the terminal in the terminal group. FIG. 6 is an interaction schematic diagram of a policy determining method according to an embodiment. As shown in FIG. 6, two AFs, two NEFs, two PCFs, and two session management functions (SMF) are illustrated as an example.

Exemplarily, for example, the terminal group includes two terminals, and the policy requested by terminal 1 is a policy request P11, and the policy requested by terminal 2 is a policy P22. The function corresponding to the terminal 1 is AF1, and the function corresponding to the terminal 2 is AF2. AF1 sends an update request for the policy P11 to NEF1, and AF2 sends an update request for the policy P22 to NEF2, e.g., the policy update request sent by AF may be directed to a policy for service quality, however it may also be other policy requests, which is not exemplified.

NEF1, based on the received update request for policy P11, performs authorization on the policy P11, and after the authorization is successful, sends an update request for policy 1 to PCF1, and PCF1 determines the policy P11 for updating terminal 1 based on the received policy P11 (Policy determination). Similarly, NEF2, based on the received update request for policy P22, performs authorization on the policy P22, and after the authorization is successful, sends an update request for policy P22 to PCF2, and PCF2 determines the policy P22 for updating terminal 2 based on the received policy P22. PCF1 sends a policy authorization request (Npcf_Policy Authorization_Update Requedt) to PCF2 to obtain the policy P22 determined by PCF2 for updating terminal 2. Based on the obtained policy P22 and policy P11, a first priority P22 of the policy P22 is determined, and a first priority P11 of policy 1 is determined, and based on a communication protocol or a predefined rule, the priority of P11 is determined to be higher than the priority of P22, and the policy for each terminal in the terminal group being updated based on a group policy of P11 is determined. It is to be noted that in response to updating the policy of each terminal in the terminal group based on P11, P11 is determined to be the first policy request.

Of course, the group policy for updating the terminal group may be determined by PCF 2, which is merely illustrative in the represent disclosure and is not a specific limitation of the present disclosure.

Figure 7:
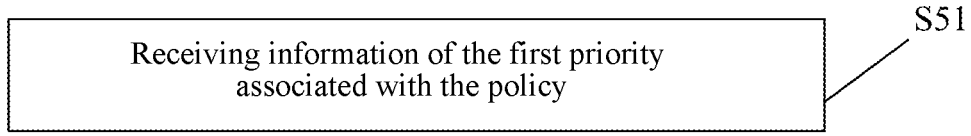
FIG. 7 is a flowchart of another policy determining method according to an embodiment of the present disclosure.

FIG. 7 is a flowchart of a policy determining method according to an embodiment. As shown in FIG. 7, the policy determining method is used in a network device and includes:

step S51, receiving information of the first priority associated with the policy.

In an embodiment of the present disclosure, AF provides the information of the first priority associated with the policy request to PCF, and PCF determines the group policy for the terminal group based on the received information of the first priority associated with the policy request. The information of the first priority associated with the policy includes a priority for each policy request in the group policy.

Figure 8:
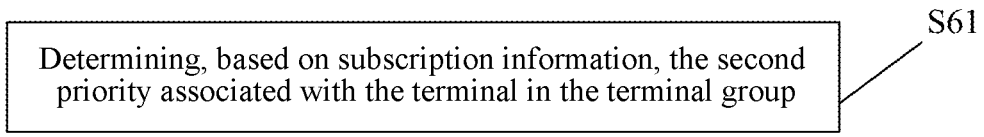
FIG. 8 is a flowchart of another policy determining method according to an embodiment of the present disclosure.

FIG. 8 is a flowchart of a policy determining method according to an embodiment. As shown in FIG. 8, the policy determining method is used in a network device and includes:

step S61, determining, based on subscription information, the second priority associated with the terminal in the terminal group.

In an embodiment of the present disclosure, the second priority associated with the terminal in the terminal group determines, based on the subscription information, a priority of the terminal in each group in UDR (User Data Repository). PCF further determines a group policy request for the terminal group.

Figure 9:
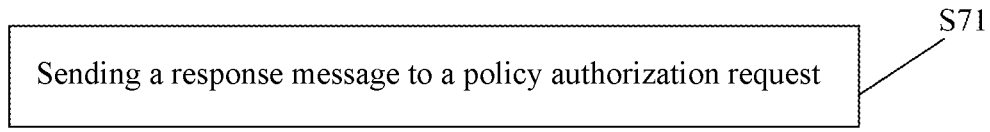
FIG. 9 is a flowchart of another policy determining method according to an embodiment of the present disclosure.

FIG. 9 is a flowchart of a policy determining method according to an embodiment. As shown in FIG. 9, the policy determining method is used in a network device and includes:

step S71, sending a response message (Npcf_PolicyAuthorization_Update Response) to a policy authorization request.

In an embodiment of the present disclosure, the response message to the policy authorization request includes the first policy request. PCF1 sends the first policy request for updating the policy of the terminal group to PCF2 by sending the response message to the policy authorization request, as shown in FIG. 6. In an embodiment, PCF1 sends the policy authorization request to PCF2 to provide PCF2 with a policy 1 received or a policy P11 determined by PCF1, and PCF1 receives the response message to the policy authorization request from PCF2 to determine the first policy request, i.e. 5a and 6a in FIG. 6. In an embodiment, PCF2 sends the policy authorization request to PCF1 to provide PCF1 with a policy P2 received or a policy P22 determined by PCF2, and PCF2 receives the response message to the policy authorization request from PCF1, i.e. 5b and 6b in FIG. 6.

Figure 10:
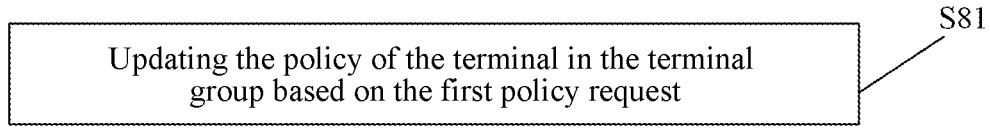
FIG. 10 is a flowchart of another policy determining method according to an embodiment of the present disclosure.

FIG. 10 is a flowchart of a policy determining method according to an embodiment. As shown in FIG. 10, the policy determining method is used in a network device and includes:

step S81, updating the policy of the terminal in the terminal group based on the first policy request.

In an embodiment of the present disclosure, PCF updates the policy request of each terminal in the terminal group based on the determined first policy request. The update policy is as shown in FIG. 6. The update policy is determined based on the first policy request, and when the first policy request is consistent with the current policy in PCF, the procedure is not necessary.

In an embodiment of the present disclosure, the execution procedure associated with the updated policy request may also be modified. As shown in FIG. 6, SMF1 and PCF1 modify the first associated terminal 1 policy based on the first policy request; and SMF2 and PCF2 modify the first associated terminal 2 policy based on the first policy request.

In an embodiment of the present disclosure, PCF needs to send a policy update response (Npcf_Policy Authorization_Update Response) to its corresponding AF. As shown in FIG. 6, PCF1 sends a policy authorization update response to NEF1, NEF1 sends, based on the received policy authorization update response, a policy authorization update response such as a policy authorization update response carrying quality of service (Nnef_AFsessionWithQoS_Update Response) to AF1, and PCF1 sends a policy notification message (Npcf_PolicyAuthorization_Notify) to NEF1. NEF1 sends a policy notification message such as a policy notification message carrying quality of service (Nnef_AFsessionWithQoS_Notify) to AF1.

Based on the same concept, an embodiment of the present disclosure also provides a policy determining device.

It is to be understood that the policy determining device provided by the embodiment of the present disclosure includes a hardware structure and/or a software module for executing a corresponding function, in order to realize the above mentioned functions. In combination with the units and algorithmic steps in the various examples disclosed in the embodiment of the present disclosure, the embodiment of the present disclosure can be implemented in the form of hardware or a combination of hardware and computer software. Whether a particular function is performed by hardware or in the way that the computer software drives the hardware depends on a particular application of the technical solution and a design constraint. A person skilled in the art may use a different approach for each particular application to implement the described functionality, but such implementation should not be considered going beyond the scope of the technical solution of the embodiment of the present disclosure.

Figure 11:
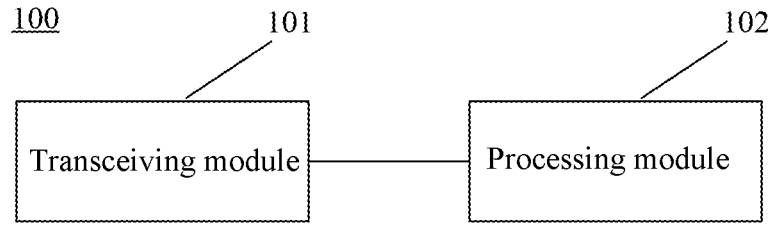
FIG. 11 is a block diagram of a network device according to an embodiment of the present disclosure.

FIG. 11 is a block diagram of a network device according to an embodiment. Referring to FIG. 11, the policy determining device 100 includes a transceiving module 101 and a processing module 102.

The transceiving module 101 is configured to obtain a plurality of policy requests for one or more terminals in a terminal group; and the processing module 102 is configured to determine a first policy request among the plurality of policy requests, the first policy request being configured to update a policy of the terminal group.

In an embodiment of the present disclosure, the processing module 102 is configured to determine the first policy request among the plurality of policy requests based on a priority. The priority includes a first priority determined based on the policy of the terminal group, and/or a second priority determined based on the terminal in the terminal group.

In an embodiment of the present disclosure, the transceiving module 101 is configured to obtain one or more policy update requests, the one or more policy update requests including one or more policy requests for the one or more terminals in the terminal group corresponding to an application; and/or obtain one or more policy authorization requests, the one or more policy authorization requests including one or more policy requests determined by an other network device for the terminal in the terminal group.

In an embodiment of the present disclosure, the transceiving module 101 is further configured to receive information of the first priority associated with the policy request.

In an embodiment of the present disclosure, the processing module 102 is further configured to determine, based on subscription information, the second priority associated with the terminal in the terminal group.

In an embodiment of the present disclosure, the transceiving module 101 is further configured to send a response message to a policy authorization request, the response message to the policy authorization request including the first policy request.

In an embodiment of the present disclosure, the processing module 102 is further configured to update the policy of the terminal in the terminal group based on the first policy request.

With respect to the device in the above embodiment, the specific manner in which each module performs an operation has been described in detail in the embodiment relating to the method, which will not be described in detail herein.

Figure 12:
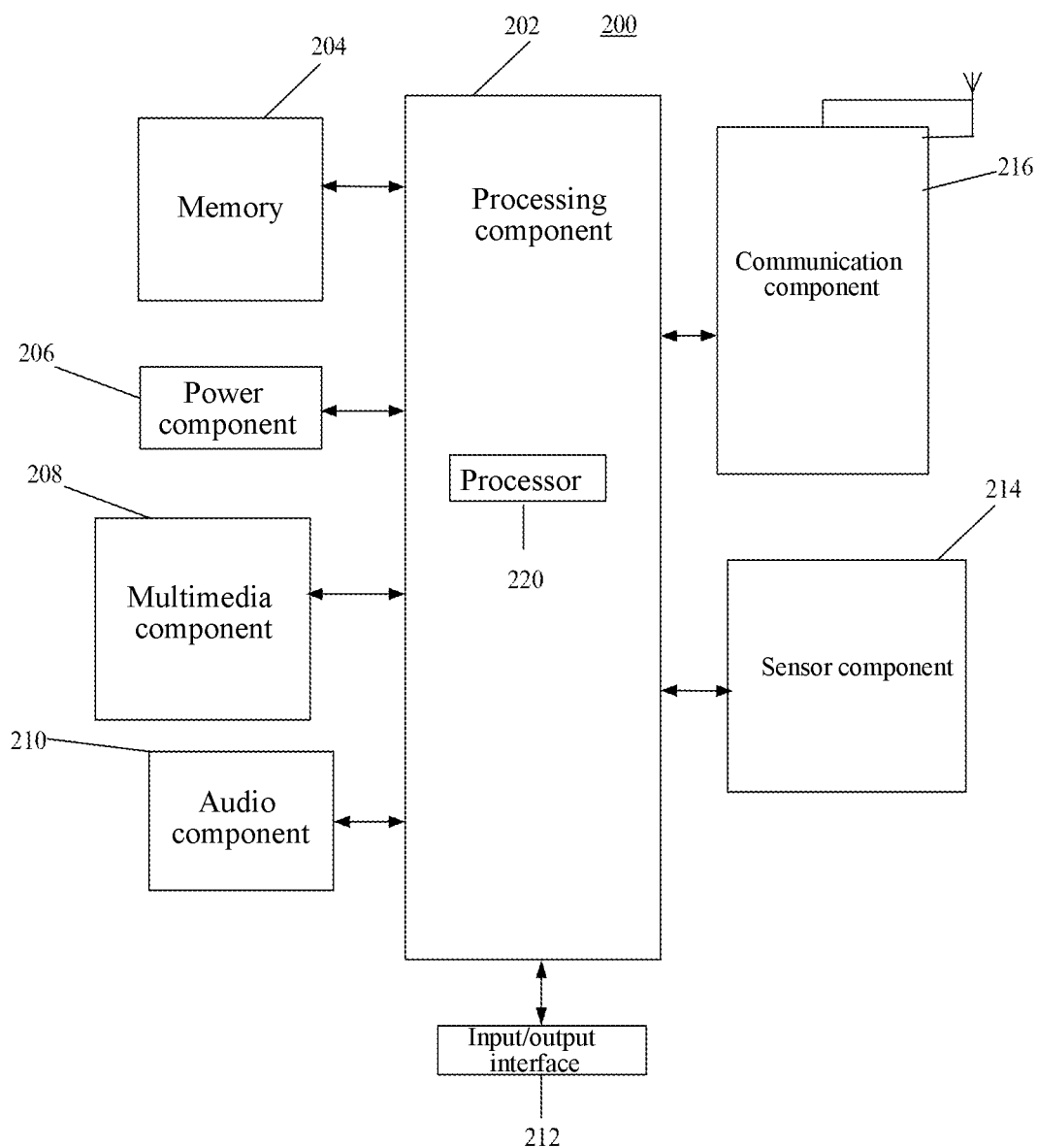
FIG. 12 is a block diagram of a network device according to an embodiment of the present disclosure.

FIG. 12 is a block diagram of a network device 200 according to an embodiment. For example, the device 200 may be a mobile phone, a computer, a digital broadcasting terminal, a messaging device, a game console, a tablet device, a medical device, a fitness device, a personal digital assistant, or the like.

Referring to FIG. 12, the device 200 may include one or more of a processing component 202, a memory 204, a power component 206, a multimedia component 208, an audio component 210, an input/output (I/O) interface 212, a sensor component 214, and a communication component 216.

The processing component 202 generally controls the overall operations of the device 200, such as operations associated with display, telephone calls, data communications, camera operations, and recording operations. The processing component 202 may include one or more processors 220 to execute instructions to complete all or part of the steps of the foregoing method. In addition, the processing component 202 may include one or more modules to facilitate interaction between the processing component 202 and other components. For example, the processing component 202 may include a multimedia module to facilitate the interaction between the multimedia component 208 and the processing component 202.

The memory 204 is configured to store various types of data to support the operation at the device 200. Examples of these data include instructions for any application or method operating on the device 200, contact data, phone book data, messages, pictures, videos and the like. The memory 204 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 206 provides power to various components of the device 200. The power component 206 may include a power management system, one or more power supplies, and other components associated with generating, managing, and distributing power for the device 200.

The multimedia component 208 includes a screen that provides an output interface between the device 200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 208 includes a front camera and/or a rear camera. When the device 200 is in an operation mode, such as a shooting mode or a video mode, the front camera and/or the rear camera can receive external multimedia data. Each front camera and rear camera may be a fixed optical lens system or have focal length and optical zoom capabilities.

The audio component 210 is configured to output and/or input audio signals. For example, the audio component 210 includes a microphone (MIC), and when the device 200 is in an operation mode, such as a call mode, a recording mode, and a voice recognition mode, the microphone is configured to receive an external audio signal. The received audio signal can be further stored in the memory 204 or sent via the communication component 216. In some embodiments, the audio component 210 further includes a speaker for outputting audio signals.

The I/O interface 212 provides an interface between the processing component 202 and a peripheral interface module. The above-mentioned peripheral interface module may be a keyboard, a click wheel, a button, and the like. These buttons may include but are not limited to home button, volume button, start button, and lock button.

The sensor component 214 includes one or more sensors for providing the device 200 with various aspects of state evaluation. For example, the sensor component 214 can detect the on/off status of the device 200 and the relative positioning of components. For example, the component is a display and keypad of the device 200. The sensor component 214 can also detect the position change of the device 200 or a component of the device 200, the presence or absence of contact between the user and the device 200, the orientation or acceleration/deceleration of the device 200, and the temperature change of the device 200. The sensor component 214 may include a proximity sensor configured to detect the presence of nearby objects when there is no physical contact. The sensor component 214 may also include a light sensor, such as a CMOS or CCD image sensor, for use in imaging applications. In some embodiments, the sensor component 214 may also include an acceleration sensor, a gyroscope sensor, a magnetic sensor, a pressure sensor, or a temperature sensor.

The communication component 216 is configured to facilitate wired or wireless communication between the device 200 and other devices. The device 200 can access a wireless network based on a communication standard, such as WiFi, 2G, or 3G, or a combination thereof. In an embodiment, the communication component 216 receives a broadcast signal or broadcast related information from an external broadcast management system via a broadcast channel. In an embodiment, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 200 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 204 including instructions, and the instructions may be executed by the processor 220 of the device 200 to complete the foregoing method. For example, the non-transitory computer-readable storage medium may be ROM, random access memory (RAM), CD-ROM, magnetic tape, floppy disk, optical data storage device and the like.

Figure 13:
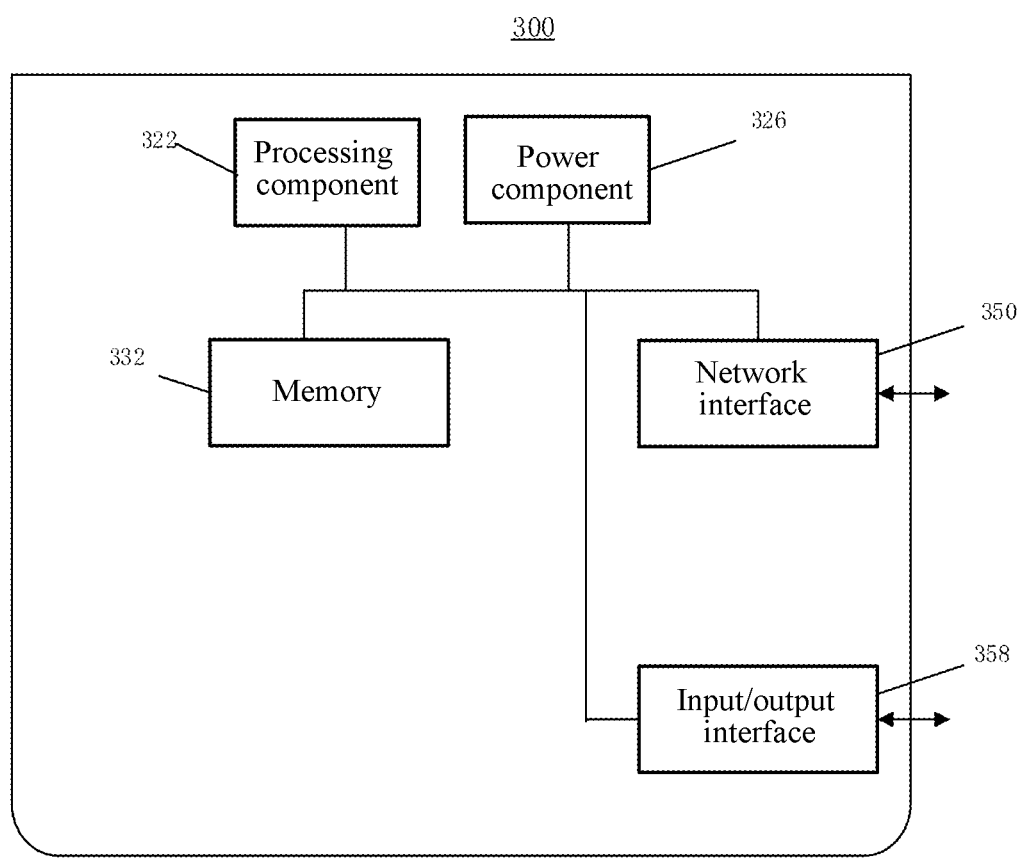
FIG. 13 is a block diagram of another network device according to an embodiment of the present disclosure.

FIG. 13 is a block diagram of a network device 300 according to an embodiment. For example, the device 300 may be provided as a server. Referring to FIG. 13, the device 300 includes a processing component 322 which further includes one or more processors, and a memory resource which is represented by a memory 332 and is configured for storing instructions such as application programs executable by the processing component 322. The application program stored in the memory 332 may include one or more modules each corresponding to a set of instructions. Furthermore, the processing component 322 is configured to execute instructions to perform the above method.

The device 300 may also include a power component 326 configured to perform power management of the device 300, a wired or wireless network interface 350 configured to connect the device 300 to a network, and an input/output (I/O) interface 358. The device 300 may operate based on an operating system stored in memory 332, such as Windows Server™, Mac OS X™, Unix™, Linux™, Free BSD™ or the like.

A first aspect of embodiments of the present disclosure provides a policy determining method, performed by a network device and including:
  obtaining a plurality of policy requests for one or more terminals in a terminal group; and
  determining a first policy request among the plurality of policy requests, the first policy request being configured to update a policy of the terminal group.

In an implementation, determining the first policy request among the plurality of policy requests includes:
  determining the first policy request among the plurality of policy requests based on a priority,
  wherein the priority includes a first priority determined based on the policy of the terminal group, and/or a second priority determined based on the terminal in the terminal group.

In an implementation, obtaining the plurality of policy requests for the one or more terminals in the terminal group includes:
  obtaining one or more policy update requests, the one or more policy update requests including one or more policy requests for the one or more terminals in the terminal group corresponding to an application; and/or
  obtaining one or more policy authorization requests, the one or more policy authorization requests including one or more policies determined by an other network device for the terminal in the terminal group.

In an implementation, the policy determining method further includes, before obtaining the plurality of policy requests for the one or more terminals in the terminal group:
  receiving information of the first priority associated with the policy.

In an implementation, the policy determining method further includes, before obtaining the plurality of policy requests for the one or more terminals in the terminal group:
  determining, based on subscription information, the second priority associated with the terminal in the terminal group.

In an implementation, the policy determining method further includes:
  sending a response message to a policy authorization request, the response message to the policy authorization request including the first policy request.

In an implementation, the policy determining method further includes:
  updating the policy of the terminal in the terminal group based on the first policy request.

A second aspect of embodiments of the present disclosure provides a policy determining device, including:
  a transceiving module, configured to obtain a plurality of policy requests for one or more terminals in a terminal group; and
  a processing module, configured to determine a first policy request among the plurality of policy requests, the first policy request being configured to update a policy of the terminal group.

In an implementation, the processing module is configured to:
  determine the first policy request among the plurality of policy requests based on a priority, wherein the priority includes a first priority determined based on the policy request of the terminal group, and/or a second priority determined based on the terminal in the terminal group.

In an implementation, the transceiving module is configured to:
  obtain one or more policy update requests, the one or more policy update requests including one or more policy requests for the one or more terminals in the terminal group corresponding to an application; and/or
  obtain one or more policy authorization requests, the one or more policy authorization requests including one or more police requests determined by an other network device for the terminal in the terminal group.

In an implementation, the transceiving module is further configured to:
  receive information of the first priority associated with the policy request.

In an implementation, the processing module is further configured to:
  determine, based on subscription information, the second priority associated with the terminal in the terminal group.

In an implementation, the transceiving module is further configured to:
send a response message to a policy authorization request, the response message to the policy authorization request including the first policy request.

In an implementation, the processing module is further configured to:
update the policy of the terminal in the terminal group based on the first policy request.

It is further understood that the term "plurality" in the present disclosure means two or more, and other quantifiers are similar. The term "and/or", describing the association of associated objects, indicates that three relationships can exist, for example, A and/or B can indicate the presence of A alone, A and B together, and B alone. The character "/" generally indicates an "or" relationship between the preceding and following associated objects. The singular forms "a", "said" and "the" are also intended to include plural forms, unless the context clearly indicates otherwise.

It is further understood that the terms "first", "second" and the like are used to describe a variety of information, but that such information should not be limited to these terms. These terms are only used to distinguish information of the same type from one another and do not indicate a particular order or level of importance. In fact, the expressions "first" and "second" may be used interchangeably. For example, without departing from the scope of the present disclosure, first information may also be referred to as second information, and similarly, second information may also be referred to as first information.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Those skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A policy determining method, comprising:
receiving, by a policy control function (PCF), information of a first priority associated with a policy, wherein the policy is a policy of a terminal group and each policy of the terminal group corresponds to one respective first priority;
determining, by the PCF based on subscription information, a second priority associated with a terminal in the terminal group, wherein each terminal in the terminal group corresponds to a respective second priority;
obtaining, by the PCF, a plurality of policy update requests sent by an application function (AF), wherein the plurality of policy update requests comprise one or more policy requests for the terminal group;
obtaining, by the PCF, one or more policy authorization requests sent by another PCF, the one or more policy authorization requests comprising one or more policy requests for the terminal in the terminal group, wherein the one or more policy requests are determined by the another PCF; and
determining, by the PCF based on the first priority and the second priority, a first policy request among the one or more policy requests for the terminal group obtained by the PCF and the one or more policy requests for the terminal in the terminal group determined by the another PCF, wherein the first policy request is configured to update the policy of the terminal group.

2. The policy determining method according to claim 1, further comprising:
sending, by the PCF, a response message to a policy authorization request, wherein the response message to the policy authorization request comprises the first policy request.

3. The policy determining method according to claim 2, further comprising:
updating, by the PCF, the policy of the terminal group based on the first policy request.

4. A policy control function (PCF), comprising:
a processor;
a memory for storing instructions executable by the processor;
wherein the processor is configured to perform acts comprising:
receiving information of a first priority associated with a policy, wherein the policy is a policy of a terminal group and each policy of the terminal group corresponds to one respective first priority;
determining, based on subscription information, a second priority associated with a terminal in the terminal group, wherein each terminal in the terminal group corresponds to a respective second priority;
obtaining a plurality of policy update requests sent by an application function (AF), wherein the plurality of policy update requests comprise one or more policy requests for the terminal group;
obtaining one or more policy authorization requests sent by another PCF, the one or more policy authorization requests comprising one or more policy requests for the terminal in the terminal group, wherein the one or more policy requests are determined by the another PCF; and
determining, based on the first priority and the second priority, a first policy request among the one or more policy requests for the terminal group obtained by the PCF and the one or more policy requests for the terminal in the terminal group determined by the another PCF, wherein the first policy request is configured to update the policy of the terminal group.

5. The PCF according to claim 4, wherein the processor is further configured to perform acts comprising:
sending a response message to a policy authorization request, wherein the response message to the policy authorization request comprises the first policy request.

6. The PCF according to claim 5, wherein the processor is further configured to perform acts comprising:
updating the policy of the terminal group based on the first policy request.

7. A non-transitory computer readable storage medium, having stored thereon instruction, wherein the instructions are executed by a processor of a policy control function (PCF), enabling the PCF to perform acts comprising:
- receiving information of a first priority associated with a policy, wherein the policy is a policy of a terminal group and each policy of the terminal group corresponds to one respective first priority;
- determining, based on subscription information, a second priority associated with a terminal in the terminal group, wherein each terminal in the terminal group corresponds to a respective second priority;
- obtaining a plurality of policy update requests sent by an application function (AF), wherein the plurality of policy update requests comprise one or more policy requests for the terminal group;
- obtaining one or more policy authorization requests sent by another PCF, the one or more policy authorization requests comprising one or more policy requests for the terminal in the terminal group, wherein the one or more policy requests are determined by the another PCF; and
- determining, based on the first priority and the second priority, a first policy request among the one or more policy requests for the terminal group obtained by the PCF and the one or more policy requests for the terminal in the terminal group determined by the another PCF, wherein the first policy request is configured to update the policy of the terminal group.

8. The non-transitory computer readable storage medium according to claim 7, wherein the PCF is further enabled to perform acts comprising:
- sending a response message to a policy authorization request, wherein the response message to the policy authorization request comprises the first policy request.

9. The non-transitory computer readable storage medium according to claim 7, wherein the PCF is further enabled to perform acts comprising:
- updating the policy of the terminal group based on the first policy request.

* * * * *